(12) United States Patent
Callan et al.

(10) Patent No.: US 9,197,545 B2
(45) Date of Patent: Nov. 24, 2015

(54) HIGHLY SCALABLE MODULAR SYSTEM WITH HIGH RELIABILITY AND LOW LATENCY

(71) Applicant: Benu Networks, Inc., Billerica, MA (US)

(72) Inventors: David F. Callan, Swampscott, MA (US); Rajendar Duggal, Lincoln, MA (US); Anil Sanghavi, Westford, MA (US); Swarup Sahoo, Acton, MA (US); Ramesh Gupta, Acton, MA (US); Rajat Ghai, Sandwich, MA (US)

(73) Assignee: BENU NETWORKS, INC., Billerica, MA (US)

( * ) Notice: Subject to any disclaimer, the term of this patent is extended or adjusted under 35 U.S.C. 154(b) by 0 days.

(21) Appl. No.: 13/896,989

(22) Filed: May 17, 2013

(65) Prior Publication Data
US 2013/0308438 A1    Nov. 21, 2013

Related U.S. Application Data

(60) Provisional application No. 61/649,067, filed on May 18, 2012, provisional application No. 61/649,001, filed on May 18, 2012, provisional application No. 61/648,990, filed on May 18, 2012.

(51) Int. Cl.
*H04L 12/851* (2013.01)
*H04L 12/703* (2013.01)
*H04L 12/24* (2006.01)
*H04L 12/775* (2013.01)
*H04L 12/26* (2006.01)

(52) U.S. Cl.
CPC ............ *H04L 45/28* (2013.01); *H04L 41/0654* (2013.01); *H04L 45/583* (2013.01); *H04L 47/24* (2013.01); *H04L 43/0882* (2013.01)

(58) Field of Classification Search
None
See application file for complete search history.

(56) References Cited

U.S. PATENT DOCUMENTS 7,636,917 B2    12/2009    Darling et al.
7,849,182 B2    12/2010    Cui et al.
8,370,528 B2    2/2013     Bryers et al.
(Continued)

OTHER PUBLICATIONS

International Search Report and Written Opinion issued by the U.S. Patent and Trademark Office as International Searching Authority in corresponding International Application No. PCT/US13/41653 dated Jul. 25, 2013 (9 pgs.).

*Primary Examiner* — Mohammad Adhami
(74) *Attorney, Agent, or Firm* — Wilmer Cutler Pickering Hale and Dorr LLP

(57) ABSTRACT

A computing system for processing network traffic includes a plurality of network ports configured to receive network traffic, a plurality of processing blades, not directly coupled with the plurality of network ports, configured to process the network traffic, a switch coupled with the plurality of processing blades and configured to support inter-blade communications among the plurality of processing blades, a router coupled with the switch and the plurality of network ports, the router configured to forward the network traffic to one or more of the plurality of processing blades based on resource information of the plurality of the processing blades, and a system controller coupled to the router and the plurality of processing blades, the system controller configured to receive and maintain the resource information from the plurality of the processing blades and further configured to update the router with the resource information of the plurality of the processing blades.

14 Claims, 12 Drawing Sheets

(56) References Cited

U.S. PATENT DOCUMENTS

| | | | |
|---|---|---|---|
| 8,677,023 B2 * | 3/2014 | Venkataraghavan et al. | 709/250 |
| 2007/0002883 A1 * | 1/2007 | Edsall et al. | 370/422 |
| 2007/0047536 A1 * | 3/2007 | Scherer et al. | 370/360 |
| 2007/0280112 A1 | 12/2007 | Zheng et al. | |
| 2008/0126542 A1 | 5/2008 | Rhoades et al. | |
| 2008/0275975 A1 | 11/2008 | Pandey et al. | |
| 2010/0103837 A1 | 4/2010 | Jungck et al. | |
| 2012/0005392 A1 | 1/2012 | Yagi | |
| 2012/0207158 A1 | 8/2012 | Srinivasan et al. | |
| 2013/0201989 A1 | 8/2013 | Hu et al. | |
| 2014/0143854 A1 | 5/2014 | Lopez et al. | |
| 2014/0223434 A1 | 8/2014 | Mulligan et al. | |

* cited by examiner

| Rule | Action |
|---|---|
| IP address is in {range} | Use Processing Blades Type X |
| Application Type = VOIP | Use Processing Blades Type Y |
| Application Type = HTTP | Use Processing Blades Type Z |
| ... | ... |
| Default | Use least utilized Processing Blade |

| Processing Blade # | Utilization |
|---|---|
| 1 | 50% |
| 2 | 60% |
| 3 | 75% |
| ... | ... |
| n | 80% |

700

| Processing Blade # | Status |
|---|---|
| 1 | UP |
| 2 | UP |
| 3 | UP |
| ⋮ | ⋮ |
| n | DOWN |

HIGHLY SCALABLE MODULAR SYSTEM WITH HIGH RELIABILITY AND LOW LATENCY

RELATED APPLICATIONS

This application claims priority to U.S. provisional patent applications Nos. 61/649,067, 61/649,001, and 61/648,990, all of which were filed on May 18, 2012 and are incorporated herein in their entireties.

FIELD

The subject matter disclosed in this application generally relates to computing and communication systems and, more specifically, to highly scalable modular systems that can provide high service availability/reliability and low latency in gateways.

BACKGROUND

Mobile and fixed networks today generally employ a diverse set of networking gateway elements which can perform a variety of tasks including subscriber management, billing and charging, authentication, security (e.g., firewall, malware detection, etc.), tunnel management, session management, and mobility management, etc. Despite the wide range of gateway offerings they generally share a common architecture. Such architecture is commonly referred to as modular computing systems or blade servers.

Modular computing and communications systems, such as blade servers, are in widespread use in corporate data centers and telecommunications facilities around the world. A typical blade server can include a metal chassis, which can contain one or more slots, into which computing or communications processing blades can be inserted. Aside from common power, cooling, and management interfaces, blade servers typically contain one or more switch fabric cards that can provide inter-slot communications in the chassis using, for example, Ethernet or some other packet formats. External network communication are typically supported through network input-output (NIO) ports. A NIO port can either be integrated into a processing blade or on a separate module that is plugged into the rear of a given blade via a connector. It follows that network traffic enters and exits through these network ports and, if necessary, is routed to the appropriate blade by the system's switch fabric card(s). These components can be housed in a multi-slot chassis which can provide common power, cooling, system management, and control functions.

FIG. 1 illustrates a block diagram of a conventional modular computing and communication system 100. The system 100 can include ports 110 (e.g., P1, P2, . . . Pn), processing blades 120 (e.g., B1, B2, . . . Bn), and an inter-slot packet switch fabric 130. In system 100, network traffic can ingress into and egress from the ports 110. In some implementations, the processor blades 120 can be integrated with the ports 110 or be paired together. In some implementations, the processing blades 120 can be run individually as independent network elements or collectively as a pooled resource. The ports 110 can typically be configured in such a way that they can be assigned to specific processing blades 120. In operation, network traffic can be forwarded to a corresponding processing blade 120 for processing network traffic and providing further routing and other value-added services. Network traffic can also be forwarded across the processing blade 120 via the switch 130, depending on the traffic processing logic and routing decisions made at the processing blade 120. Traditional blade server systems such as the system 100 may provide rudimentary scalability through addition of processor blades 120 and ports 110. In such systems the processing blades 120 can typically be treated as standalone or as loosely coupled processing elements. However, these systems do not provide fine-grain control or scalability of computing or communications services.

FIG. 2 demonstrates a sample network traffic path in the conventional computing and communication system 100 in FIG. 1. In this example, network traffic ingresses at a port 110 (e.g., P1) and is usually bound to a specific processor blade 120 (e.g., B1) for, e.g., the management and routing of subscriber sessions. However, network traffic sometimes can be routed via the switch 130 to a different processing blade 120 (e.g., B2). In this situation, latency increases due to the multiple hops into and out of the system 100. Depending on the number of hops this latency can be significant and thus can result in degraded (suboptimal) performance.

FIG. 3 illustrates a block diagram of another conventional modular computing and communication system 300. The system 300 can include ports 310 (e.g., P1 . . . Pn), processing blades 320 (e.g., B1 . . . Bn), an inter-slot packet switch fabric 330, a standby port 340, and a standby processing blade (SPB) 350. The system 300 can provide some degree of service availability through, for example, the use of the SPB 350. The SPB 350 can provide the same functions as the processing blades 320 it backs up. In some implementations, the SPB 350 can maintain a global table/database of sessions of each active processing blade 320. The SPB 350 can back up as few as one processing blade 320, in which case this is known as 1:1 redundancy, or it can back up an arbitrary number (N) of processing blades 320, which is referred to as 1:N redundancy. When the failure of a processing blade 320 is detected, the SPB 350 can be switched from the standby mode to the active mode and can use its session database to re-establish sessions that were hosted on the failed processing blade 320. Depending on the implementations, the number of active sessions, and the complexity of the services being delivered, complete session recovery can take as much as several minutes. In addition, the need to maintain complete global knowledge of all active sessions imposes increased computational, memory, and intra-chassis communications requirements on the SPB 350, compared to the processing blades 320 it backs up. It naturally follows that the SPB 350 usually has a different hardware and software configuration from the active processing blades 320 and has scaling limits.

SUMMARY

In accordance with the disclosed subject matter, systems and methods are described for a highly scalable modular system with high reliability and low latency.

Disclosed subject matter includes, in one aspect, a computing system for processing network traffic, which includes a plurality of network ports configured to receive network traffic, a plurality of processing blades, not directly coupled with the plurality of network ports, configured to process the network traffic, a switch coupled with the plurality of processing blades and configured to support inter-blade communications among the plurality of processing blades, a router coupled with the switch and the plurality of network ports, the router configured to forward the network traffic to one or more of the plurality of processing blades based on resource information of the plurality of the processing blades, and a system controller coupled to the router and the plurality of processing blades, the system controller configured to receive and maintain the resource information from the plurality of the processing blades and further configured to update the router with the resource information of the plurality of the processing blades.

In some embodiments, the resource information includes at least one of utilization, load, and health status of a processing blade.

In some other embodiments, each of the plurality of processing blades contains a resource manager configured to gather the resource information of the each of the plurality of processing blades and send the resource information to the system controller.

In some other embodiments, the router includes a dynamic forwarding table containing rules for forwarding the network traffic.

In some other embodiments, the rules are based on the resource information of the plurality of processing blades.

In some other embodiments, the system controller includes a state table containing the resource information received from the plurality of processing blades.

In some other embodiments, the plurality of processing blades are configured to communicate with the system controller via a software-based messaging mechanism.

Disclosed subject matter includes, in another aspect, a computerized method of processing network traffic, which includes receiving at a system controller resource information from a plurality of processing blades, updating a router by the system controller with the resource information of the plurality of processing blades, receiving network traffic at a network port, and forwarding the networking traffic by the router to one or more of the plurality of processing blades based on the resource information of the plurality of processing blades, wherein the network port is not directly coupled with the plurality of processing blades.

In some embodiments, the resource information includes at least one of utilization, load, and health status of a processing blade.

In some other embodiments, the computerized method further includes receiving at the system controller the resource information from the plurality of processing blades via a software-based messaging mechanism.

Disclosed subject matter includes, in yet another aspect, a computing system for processing network traffic, which includes a plurality of network ports configured to receive network traffic, a plurality of processing blades, not directly coupled with the plurality of network ports, configured to process the network traffic, a switch coupled with the plurality of processing blades and configured to support inter-blade communications among the plurality of processing blades, and a content-aware router coupled with the switch and the plurality of network ports, the content-aware router configured to classify and tag the network traffic and forward the network traffic, based on content information of the network traffic, to one of the plurality of processing blades without going through another of the plurality of processing blades.

In some embodiments, the content information of the network traffic includes at least one of a source address, a destination address, an application type, a protocol type, and a key word of the network traffic.

In some other embodiments, the content-aware router includes a dynamic forwarding table containing rules for classifying, tagging, and forwarding the network traffic.

In some other embodiments, the rules are based on the content information of the network traffic.

In some other embodiments, the computing system further includes a system controller coupled to the content-aware router and the plurality of processing blades, the system controller configured to receive and maintain state information from the plurality of the processing blades and further configured to update the content-aware router with the state information of the plurality of the processing blades.

In some other embodiments, the state information includes at least one of utilization, load, and health status of a processing blade.

In some other embodiments, each of the plurality of processing blades contains a resource manager configured to gather the state information of the each of the plurality of processing blades and send the state information to the system controller.

In some other embodiments, the system controller includes a state table containing the state information received from the plurality of processing blades.

In some other embodiments, the plurality of processing blades are configured to communicate with the system controller via a software-based messaging mechanism.

In some other embodiments, the content-aware router is further configured to concatenate different types of services in the network traffic.

Disclosed subject matter includes, in yet another aspect, a computerized method of processing network traffic, which includes receiving network traffic at a network port, and classifying and tagging the network traffic and forwarding the networking traffic by a content-aware router, based on the content information of the plurality of processing blades, to one of the plurality of processing blades without going through another of the plurality of processing blades, wherein the network port is not directly coupled with the plurality of processing blades.

In some embodiments, the content information of the network traffic includes at least one of a source address, a destination address, an application type, a protocol type, and a key word of the network traffic.

In some other embodiments, the computerized method further includes receiving at a system controller state information from the plurality of processing blades, and updating the content-aware router by the system controller with the state information of the plurality of processing blades.

In some other embodiments, the state information includes at least one of utilization, load, and health status of a processing blade.

In some other embodiments, the computerized method further includes receiving at the system controller the state information from the plurality of processing blades via a software-based messaging mechanism.

In some other embodiments, the computerized method further includes concatenating by the content-aware router different types of services in the network traffic.

Disclosed subject matter includes, in yet another aspect, a computing system for processing network traffic, which includes a plurality of network ports configured to receive network traffic, a plurality of processing blades, not directly coupled with the plurality of network ports, configured to process the network traffic, a switch coupled with the plurality of processing blades and configured to support inter-blade communications among the plurality of processing blades, a router coupled with the switch and the plurality of network ports, the router configured to forward the network traffic to one or more of the plurality of processing blades based on forwarding rules, and a system controller coupled to the router and the plurality of processing blades, the system controller configured to detect a fault of one of the plurality of processing blades and further configured to update the forwarding rules of the router, upon detecting the fault, to divert the network traffic from the faulted processing blade to at least one different processing blade.

In some embodiments, the fault indicates the one of the plurality of processing blades has failed or is about to fail.

In some other embodiments, the system controller includes a state table containing session information received from the plurality of processing blades.

In some other embodiments, each of the plurality of processing blades contains a resource manager configured to gather the session information of the each of the plurality of processing blades and send the session information to the system controller.

In some other embodiments, the system controller is configured to send the session information of the faulted processing blade, upon detecting the fault, to the at least one different processing blade.

In some other embodiments, the plurality of processing blades are configured to communicate with the system controller via a software-based messaging mechanism.

In some other embodiments, an average load per processing blade (Lb) is less than $Cb*(N-1)/N$, where Cb is a blade capacity and N is the number of processing blades.

Disclosed subject matter includes, in yet another aspect, a computerized method of processing network traffic, which includes receiving network traffic at a network port, detecting by a system controller a fault of one of a plurality of processing blades, updating by the system controller forwarding rules of a router, and forwarding the network traffic by the router based on the updated forwarding rules to divert the network traffic from the faulted processing blade to at least one different processing blade, wherein the network port is not directly coupled with the plurality of processing blades.

In some embodiments, the fault indicates the one of the plurality of processing blades has failed or is about to fail.

In some other embodiments, the computerized method further includes receiving at the system controller session information from the plurality of processing blades.

In some other embodiments, the computerized method further includes sending the session information of the faulted processing blade, upon detecting the fault, to the at least one different processing blade.

In some other embodiments, the plurality of processing blades are configured to communicate with the system controller via a software-based messaging mechanism.

In some other embodiments, the computerized method further includes keeping an average load per processing blade (Lb) less than $Cb*(N-1)/N$, where Cb is a blade capacity and N is the number of processing blades.

Disclosed subject matter includes, in yet another aspect, a computing system for processing network traffic, which includes a plurality of network ports configured to receive network traffic, a plurality of processing blades, not directly coupled with the plurality of network ports, configured to process the network traffic, each of the plurality of processing blades belonging to one or more session pairs of processing blades, a switch coupled with the plurality of processing blades and configured to support inter-blade communications among the plurality of processing blades, a router coupled with the switch and the plurality of network ports, the router configured to forward the network traffic to one or more of the plurality of processing blades based on forwarding rules, and a system controller coupled to the router and the plurality of processing blades, the system controller configured to detect a fault of one of the plurality of processing blades and further configured to update the forwarding rules of the router, upon detecting the fault, to divert the network traffic from the faulted processing blade to at least one different processing blade.

In some embodiments, the fault indicates the one of the plurality of processing blades has failed or is about to fail.

In some other embodiments, the system controller includes a state table containing session information received from the plurality of processing blades.

In some other embodiments, each of the plurality of processing blades contains a resource manager configured to gather the session information of the each of the plurality of processing blades and send the session information to the system controller.

In some other embodiments, each processing blade within a session pair contains session information of the other processing blade in the same session pair.

In some other embodiments, a healthy processing blade in a session pair to which the faulted processing blade belongs is configured to, upon detecting the fault, send the session information of the faulted processing blade to the system controller, and the system controller is further configured to send the session information of the faulted processing blade to the at least one different processing blade.

In some other embodiments, the plurality of processing blades are configured to communicate with the system controller via a software-based messaging mechanism.

In some other embodiments, each processing blade is further configured to detect a fault of the other processing blade within a session pair to which the each processing blade belongs.

Disclosed subject matter includes, in yet another aspect, a computerized method of processing network traffic, which includes receiving network traffic at a network port, detecting by a system controller a fault of one of a plurality of processing blades, wherein the faulted processing blade belonging to a session pair along with another processing blade, updating by the system controller forwarding rules of a router, and forwarding the network traffic by the router based on the updated forwarding rules to divert the network traffic from the faulted processing blade to at least one different processing blade, wherein the network port is not directly coupled with the plurality of processing blades.

In some embodiments, the fault indicates the one of the plurality of processing blades has failed or is about to fail.

In some other embodiments, the computerized method further includes receiving at the system controller session information from the plurality of processing blades.

In some other embodiments, the computerized method further includes sending the session information of the faulted processing blade, by a healthy processing blade in a session pair to which the faulted processing blade belongs, to the system controller, and sending the session information of the faulted processing blade, by the system controller, to the at least one different processing blade.

In some other embodiments, the plurality of processing blades are configured to communicate with the system controller via a software-based messaging mechanism.

Various embodiments of the subject matter disclosed herein can provide one or more of the following capabilities. Systems and methods disclosed herein can increase system utilization, reduce system latency, improve system reliability and service continuity, and enhance system availability.

These and other capabilities of embodiments of the disclosed subject matter will be more fully understood after a review of the following figures, detailed description, and claims.

DESCRIPTION

In the following description, numerous specific details are set forth regarding the systems and methods of the disclosed subject matter and the environment in which such systems and methods may operate, in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments described below are only examples, and that it is contemplated that there are other systems and methods that are within the scope of the disclosed subject matter.

Figure 4:
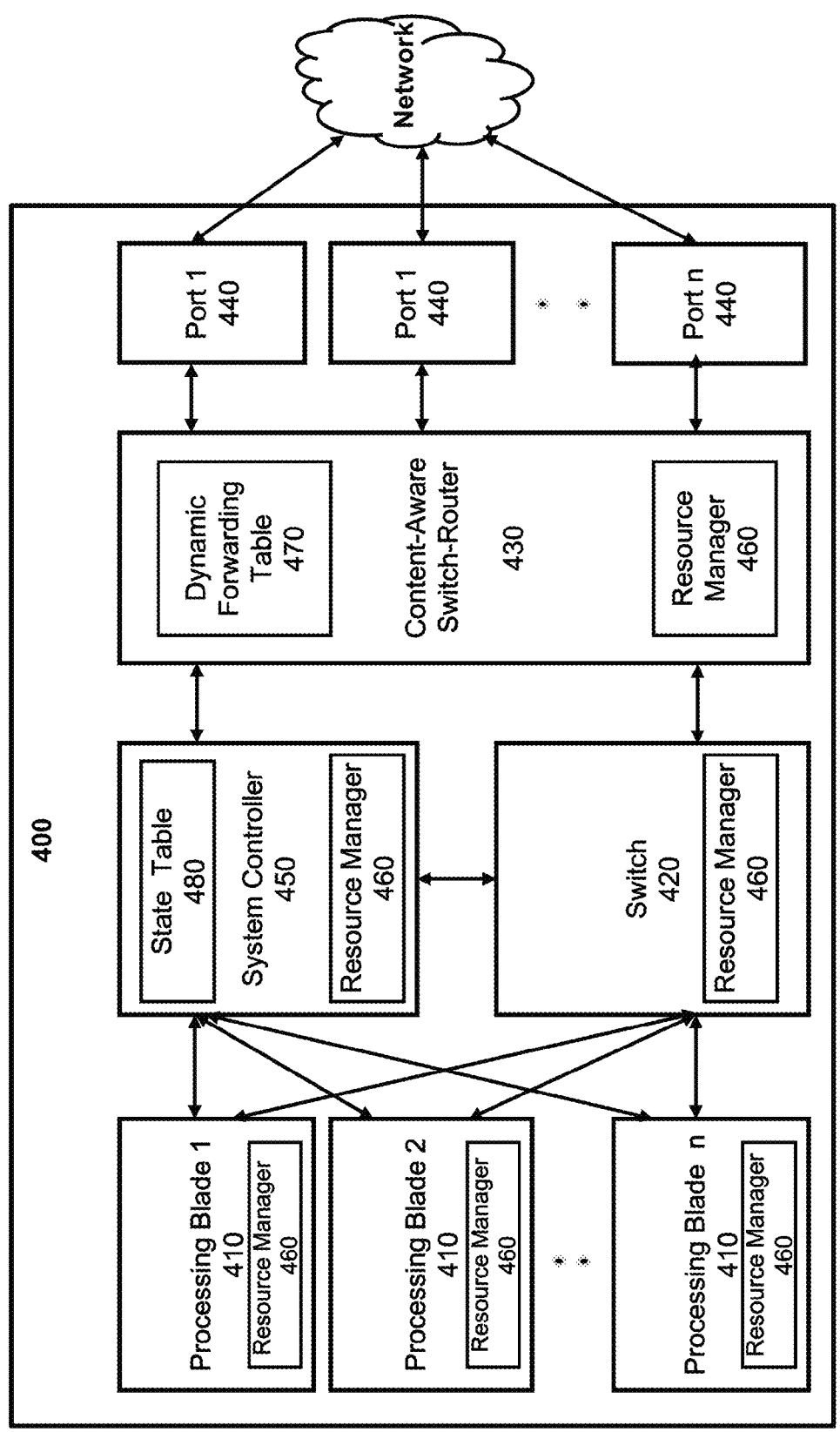
FIG. 4 illustrates a block diagram of a highly scalable modular system according to certain embodiments of the disclosed subject matter.

FIG. 4 illustrates a block diagram of a highly scalable modular system 400 according to certain embodiments of the disclosed subject matter. The system 400 can include one or more processing blade 410, a switch 420, a content-aware switch-router (CSR) 430, one or more network I/O ports 440, and a system controller (SC) 450. The switch 420 and the CSR 430 can be implemented either as two discrete elements or as an integrated element in the system 400. The processing blades 410 can be inter-connected via the switch 420. The switch 420 can be connected to and communicate with the CSR 430. The CSR 430 can be connected to and communicate with the ports 440. The SC 450 can be connected to and communicate with the processing blades 410, the switch 420, and the CSR 430. In the embodiments illustrated in FIG. 4, the processing blades 410 and the ports 440 are not directly coupled to each other. Instead, the CSR 430 can provide connections between the ports 440 and the pool of processing blades 410. The connections among components within the system 400 can be static or dynamic.

Referring to FIG. 4, a processing blade 410 can have one or many CPUs (e.g. Intel microprocessors) for computing, RAM, memory for data storage, and some other communication chipsets for transferring data in and out of the processing blade 410 from/to other components of the system 400. Processing blades 410 can be the platforms where specific applications run. For example, a processing blade can run as, among others, a wireless access gateway which can be responsible for providing wireless access to client devices. Each processing blade 410 can have a unique ID within the system 400. Each processing blade 410 can contain a resource manager (RM) 460. The RM 460 can help optimize processing load distribution among the processing blades 410. The RM 460 can send information about the associated processing blade 410, such as resource utilization and current workload, to the SC 450. The communication between the RMs 460 and the SC 450 can be via a software based messaging mechanism.

The switch 420 can be implemented in hardware, software, or a combination of both. In some embodiments, the processing blades 410 can be connected to each other by creating a cross-bar style switching bus between the processing blades 410. The flow of data from a processing blade 410 to any other processing blade 410 can be controlled by the SC 450 that controls the cross-bar and hence the communication paths. The switch 420 can also contain a resource manager (RM) 460.

The CSR 430 can classify and tag the network traffic flowing through it. The CSR 430 can include a dynamic forwarding table (DFT) 470. The DFT 470 can have the traffic classification and forwarding rules for the proper distribution and routing of network traffic to and from the processing blades 410. A traffic flow can be the network traffic between local (i.e. in-chassis/on-blade) and external network resources (server, client, mobile phone, etc.) that can be uniquely identified by, e.g., a 5 tuple {source IP address, destination IP address, source port, destination port, protocol type}. In some embodiments, the CSR 430 can serve as the path of all ingress traffic flows of the system 400. The CSR 430 can classify and uniquely tag the traffic flows (e.g., by the unique IDs of the processing blades) and then optimally assign processing blade(s) 410 to a give traffic flow based on classification rules and system health. The rules in the DFT 470 can allow for optimal classification, tagging, and forwarding of network traffic in the system 400. The rules in the DFT 470 can also be affected by real-time utilization, load, and status in the system 400 based on information collected by the SC 450 and the RMs 460 on processing blades 410 of the system 400. The CSR 430 can also contain a resource manager (RM) 460.

The ports 440 can include network interface controllers and can include hardware and/or software that enables connection of the system 400 to a computer network (e.g., an IP network).

The SC 450 can aggregate real-time status and state information received from the RMs 460, e.g., running on the processor blades 410. The SC 450 can have a state table (ST) 480 which can store these information including session states of the processing blades 410. The ST 480 can help provide high availability and system reliability. Real-time information can be stored in the ST 480 of the SC 450. Information in the ST 480 can be used to generate the DFT 470 in the CSR 430. The SC 450 can help distribute loads among the processing blades 410 of the system 400. Further, in the event of a processing blade failure, the SC 450 can help distribute the affected sessions from the failed processing blade to other active processing blades, hence making the system resilient to failures. The SC 450 can also contain a resource manager (RM) 460.

In one exemplary scenario, network traffic can enter the system 400 through the port 440 where it can be classified, tagged, and routed to the appropriate processing blade 410 by the CSR 430. Classification can be done through a set of rules derived from a combination of the network traffic flow, protocol types, associated application, and other content embedded in the packet streams. Once tagged, the network traffic can be assigned a unique tag ID and be passed to the switch 420, which can deliver it to the appropriate processing blade 410 based on its tag ID. Conversely, network traffic exiting from a processing blade 410 can be handed off to the switch 420 which can then forward it to the CSR 430 for processing. The CSR 430 can classify and tag the traffic and then forward it to the appropriate port 440 or deliver it back to the switch 420 for delivery to another processing blade 410 for further processing. In some embodiments, different types of services within the network traffic (e.g., network service, subscriber management service, and application service) can be concatenated or daisy-chained in the system 400 by the CSR 430.

Figure 5:
FIG. 5 shows one exemplary set of rules according to certain embodiments of the disclosed subject matter.

FIG. 5 shows one exemplary set of rules 500 according to certain embodiments of the disclosed subject matter. According to the rules 500 listed in FIG. 5, if the IP address is in a certain range, use processing blades type X; if the application type is voice over IP (VoIP), use processing blades type Y; if the application type is hypertext transport protocol (HTTP), use processing blades type Z; if none of the defined conditions is met, by default use the least utilized processing blade. In some embodiments, the rules 500 can be contained in the DFT 470 of the CSR 430 in the system 400.

Figure 6:
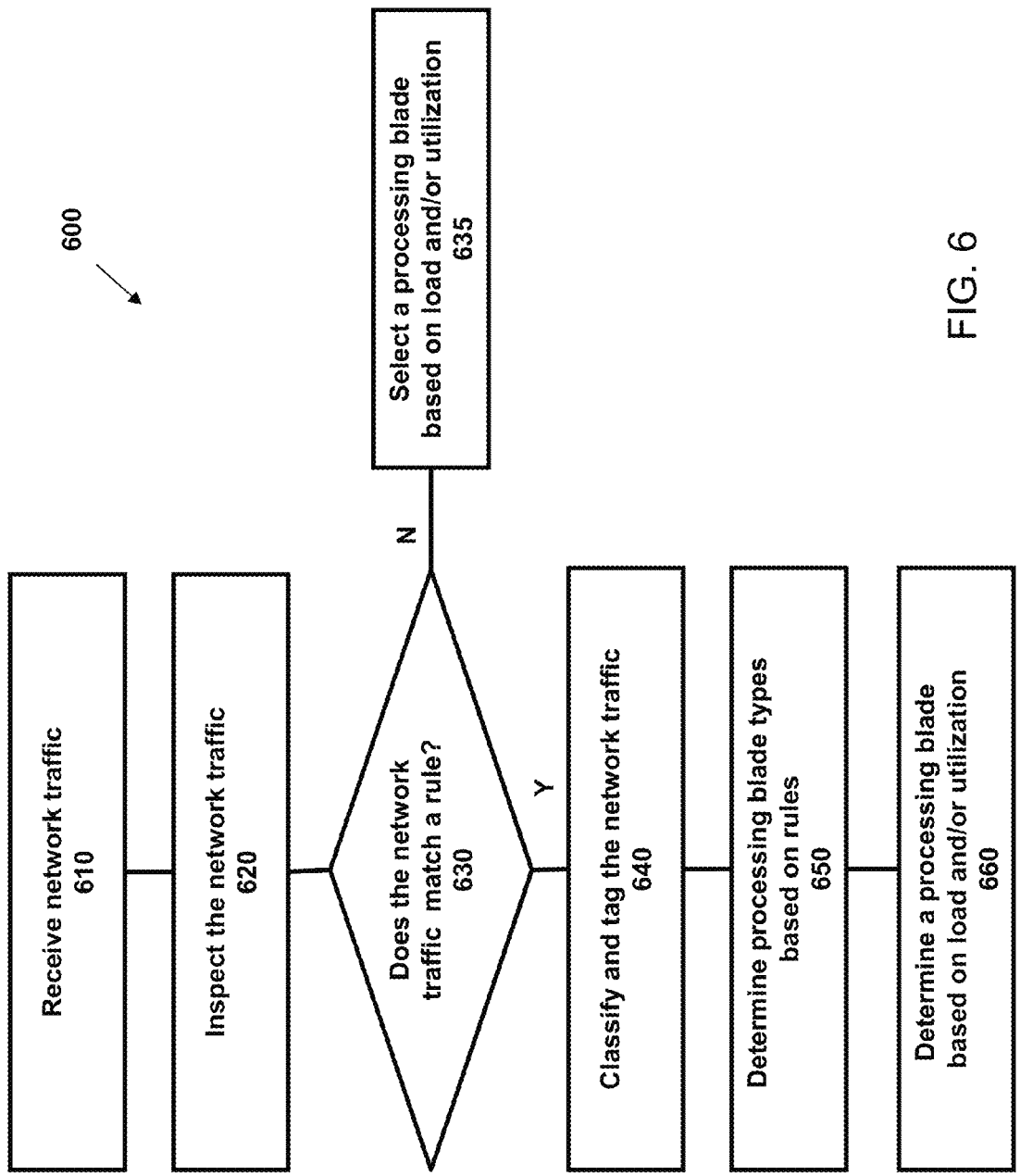
FIG. 6 illustrates an exemplary operation of processing network traffic according to certain embodiments of the disclosed subject matter.

FIG. 6 illustrates an exemplary operation 600 of processing network traffic according to certain embodiments of the disclosed subject matter. The operation 600 can be performed in the CSR 430 of the system 400. At stage 610, network traffic (e.g., IP traffic) can be received, e.g., at the CSR 430 of the system 400. At stage 620, the network traffic can be inspected, e.g., by the CSR 430. For example, the CSR 430 can examine the packets of the network traffic. At stage 630, it can be determined, e.g., by the CSR 430, whether the network traffic matches a rule (e.g., as one of the rules 500 in FIG. 5). For example, the CSR 430 can look up the rules stored in the DFT 470. At stage 635, if there is no match, a processing blade can be selected, e.g., by the CSR 430, based on load and/or utilization. At stage 640, if there is a match, the network traffic is can be classified and tagged. At stage 650, processing blade types can be determined based on rules (e.g., as the rules 500 in FIG. 5). At stage 660, a processing blade can be determined based on load and/or utilization.

Figure 7:
FIG. 7 shows one exemplary list of processing blade utilizations according to certain embodiments of the disclosed subject matter.

FIG. 7 shows one exemplary list of processing blade utilizations 700 according to certain embodiments of the disclosed subject matter. According to the list 700 in FIG. 7, the processing blade 1 has a utilization of 50%; the processing blade 2 has a utilization of 60%; the processing blade 3 has a utilization of 75%; and the processing blade n has a utilization of 80%. In some embodiments, the list of utilization 700 can be maintained in ST 480 of the SC 450 in the system 400.

Figure 8:
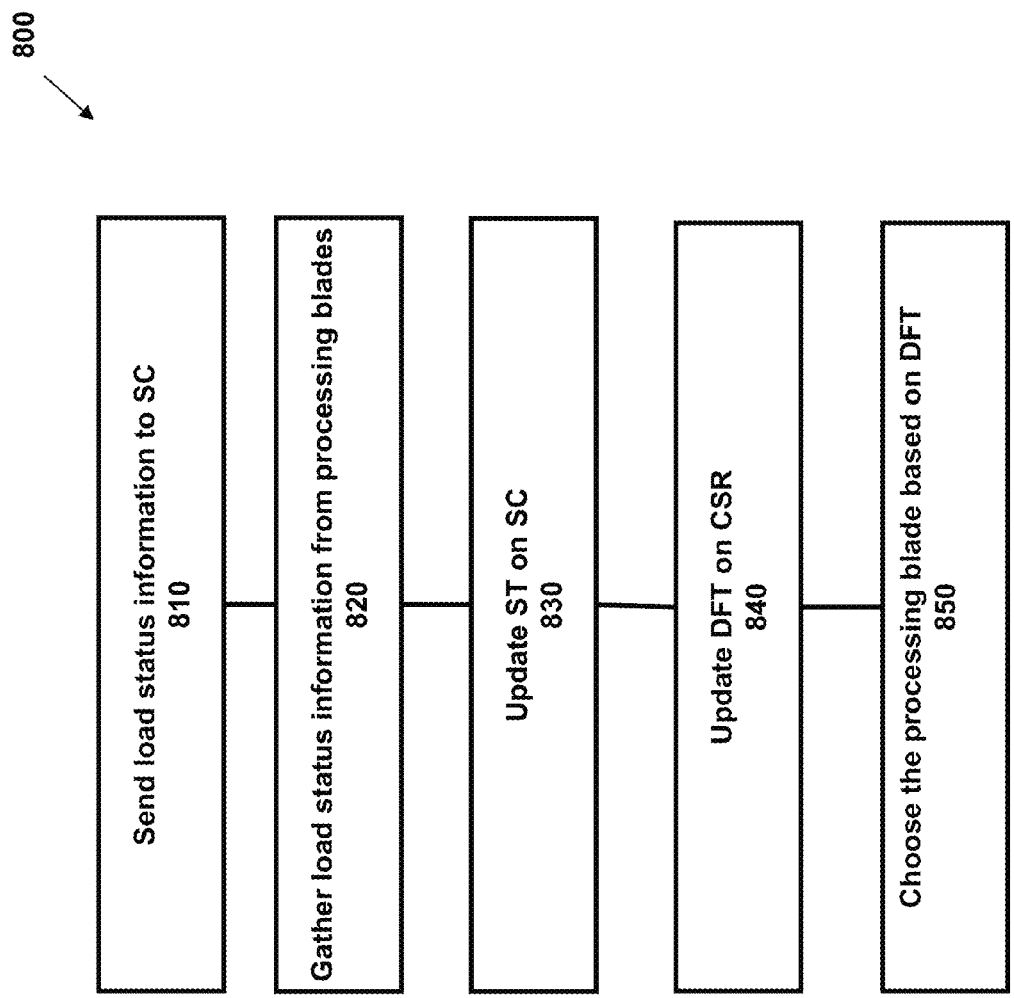
FIG. 8 illustrates another exemplary operation of processing network traffic according to certain embodiments of the disclosed subject matter.

FIG. 8 illustrates an exemplary operation 800 of processing network traffic according to certain embodiments of the disclosed subject matter. The operation 800 can be performed in the system 400. At stage 810, load status information of each processing blade 410 can be sent to the SC 450. In some embodiments, the RM 460 on each processing blade can send the load status to the SC 450 periodically or on demand. At stage 820, the load status information of the processing blades 410 can be gathered. In some embodiments, the SC 450 can gather the load status information of all processing blades 410 and create a table (e.g., as illustrated in FIG. 7). At stage 830, the ST 480 on the SC 450 can be updated based on the load status information of the processing blades. In some embodiments, the SC 450 can store the load status information table in the ST 480 and update the ST 480 accordingly. At stage 840, the DFT 470 on the CSR 430 can be updated. In some embodiments, the SC 450 can update the DFT 470 on the CSR 430 based on the most recent load status information maintained at the ST 480. At stage 850, the processing blade for incoming network traffic can be chosen based on the updated DFT 470. In some embodiments, the CSR 430 can determine the processing blade 410 based on the DFT 470. For example, the CSR 430 can select the processing blade with the lowest load and/or utilization.

Figure 9:
FIG. 9 shows one exemplary list of processing blade statuses according to certain embodiments of the disclosed subject matter.

FIG. 9 shows one exemplary list of processing blade statuses 900 according to certain embodiments of the disclosed subject matter. According to the list 900 in FIG. 9, the processing blades 1, 2, and 3 are UP while the processing blade n is DOWN. In some embodiments, the list of status 900 can be maintained in ST 480 of the SC 450 in the system 400.

Figure 10:
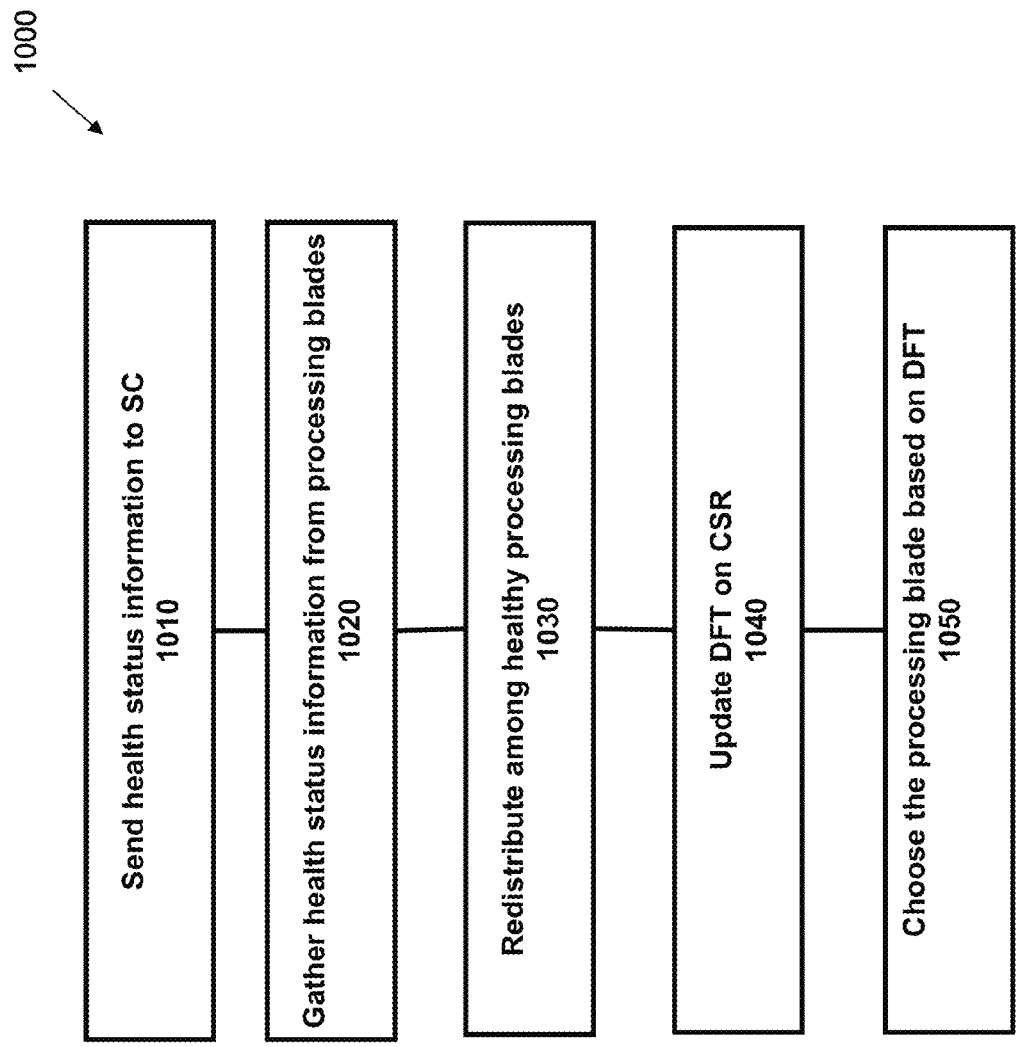
FIG. 10 illustrates yet another exemplary operation of processing network traffic according to certain embodiments of the disclosed subject matter.

FIG. 10 illustrates an exemplary operation 1000 of processing network traffic according to certain embodiments of the disclosed subject matter. The operation 1000 can be performed in the system 400. At stage 1010, health status information of each processing blade 410 can be sent to the SC 450. In some embodiments, the RM 460 on each processing blade can send the health status to the SC 450 periodically or on demand. At stage 1020, the health status information of the processing blades 410 can be gathered. In some embodiments, the SC 450 can gather the health status information of all processing blades 410 and create a table (e.g., as illustrated in FIG. 9). In addition, the ST 480 on the SC 450 can be updated based on the health status information of the processing blades. At stage 1030, if any processing blade is down, the affected traffic sessions can be re-distributed among other health processing blades. At stage 1040, the DFT 470 on the CSR 430 can be updated. In some embodiments, the SC 450 can update the DFT 470 on the CSR 430 based on the most recent health status information maintained at the ST 480. At stage 1050, the processing blade for incoming network traffic can be chosen based on the updated DFT 470. In some embodiments, the CSR 430 can determine the processing blade 410 based on the DFT 470. For example, a faulty processing blade can be removed from the DFT 470 and thus CSR 430 can avoid forwarding network traffic to the faulty processing blade.

In some embodiments, the network traffic flow can be assigned to any processing blade 410 based on the DFT 470 on the CSR 430. The CSR 430 can help choose a least utilized processing blade 410 to improve system load balance. Load balancing can be achieved by utilizing the RMs 460 that run on processor blades 410. The RM 460 can monitor the health status of a given processing blade 410 and provide a real-time status report on key resources (e.g., memory, CPU utilization, active applications, active sessions, threads, etc.) of that processing blade. These information can be sent periodically or by event driven to the SC 450 that can aggregate these information from the processing blades 410 and store them in the state table (ST) 480. The state table 480 can be used to update the rules in the DFT 470 in the CSR 430. The CSR 430 can utilize the DFT 470 for optimal classification, tagging and forwarding of network traffic in the system 400.

In some embodiments, the CSR 430 can classify the network traffic flow (e.g., IP traffic) entering the system 400. There can be a forwarding rule defined for every class. The classifying rules can be based in part on resource utilization information received from the RMs 460 and stored in the ST 480. Such rules can be used to optimally distribute traffic flows having the same classification across multiple processing blades 410 in the system 400. These functions and features can improve overall system utilization and latency, system reliability and service continuity, and system availability. These functions and features are discussed in details below.

Increased System Utilization

In one aspect, systems and methods according to some embodiments of the disclosed subject matter can increase system utilization.

Figure 1:
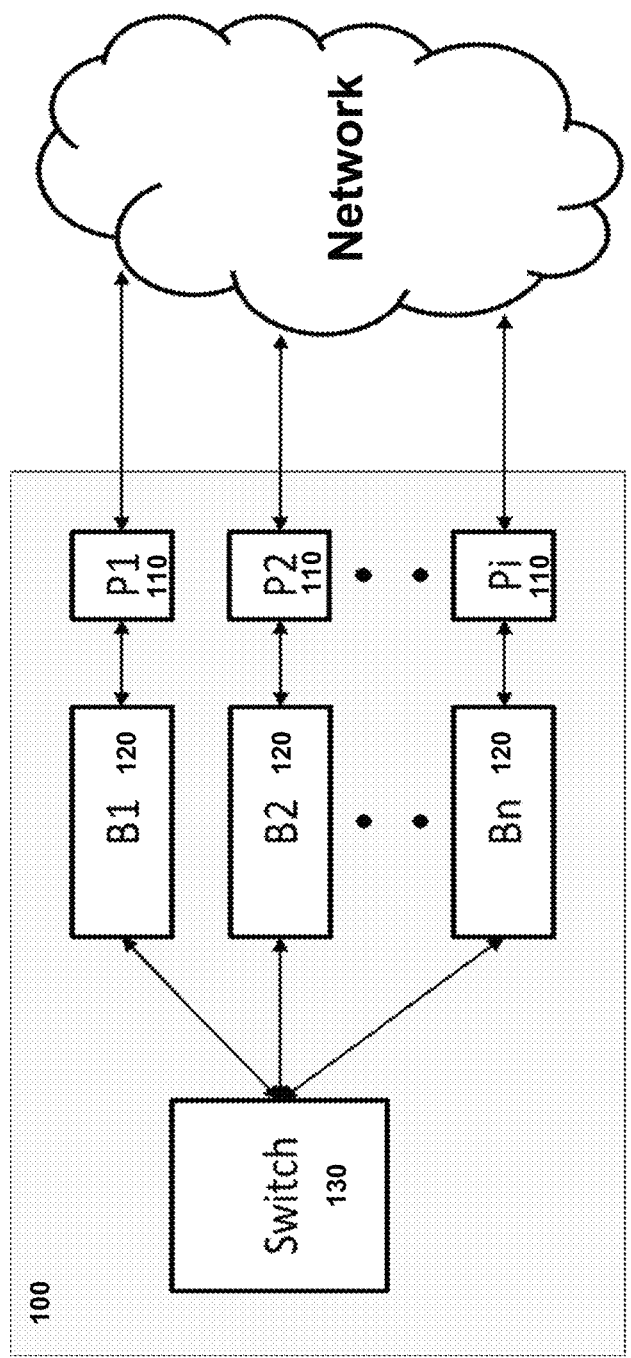
FIG. 1 illustrates a block diagram of a conventional modular computing and communication system.

In the conventional modular computing and communication system 100 illustrated in FIG. 1, each processing blade 120 usually provides the same set of computing and/or communications services as the others. Typically system traffic load is statically assigned to one or the other processing blade 120. In such a system the offered traffic load can vary greatly from blade to blade with one blade experiencing a high load and the other experiencing a low load. In an extreme case one processing blade (e.g., B1) can be 100% loaded while the other processing blade (e.g., B2) can be 0% loaded, resulting in an overall system utilization of 50% or less (e.g., when traffic gets dropped).

In contrast, systems and methods according to some embodiments of the disclosed subject matter (e.g., 400) can help increase system utilization. In some embodiments, the CSR 430 in the system 400 can serve as an integral, high-performance, application-agnostic load balancer. Based on real-time resource information, e.g., gathered from the RMs 460 on the processing blades 410, dynamic forwarding rules can be created and updated in real-time and contained in the DFT 470. These dynamic forwarding rules can apportion traffic flows to all available processing blades based on their current utilizations. With a reasonable smoothing function/feedback loop employed, this can lead to better spreading of traffic/transactions across all available processing blades in the system 400, resulting in significantly better overall system utilization. For example, in a system 400 with two processing blades 410, if the aggregated offered traffic load approaches 200%, the CSR 430 can help balancing the load so that each processing blade runs at nearly 100% capacity, thus giving an overall system utilization of about 200%.

Reduced System Latency

In another aspect, systems and methods according to some embodiments of the disclosed subject matter can reduce system latency.

Figure 2:
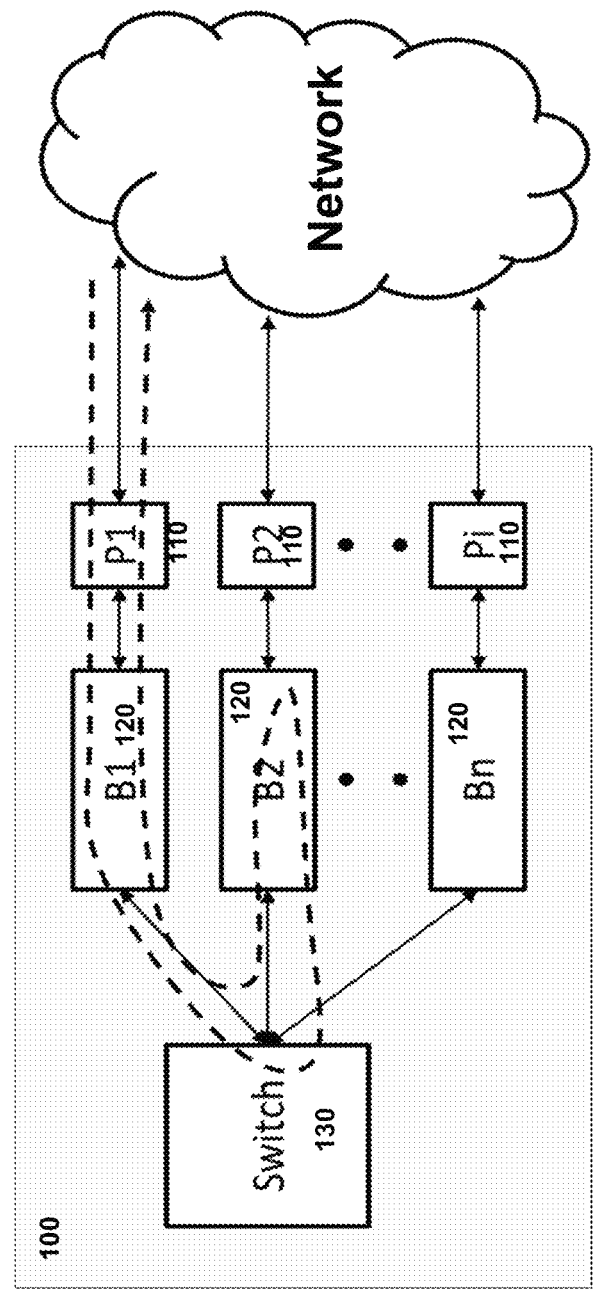
FIG. 2 illustrates a sample network traffic path in the conventional computing and communication system in FIG. 1.
Figure 3:
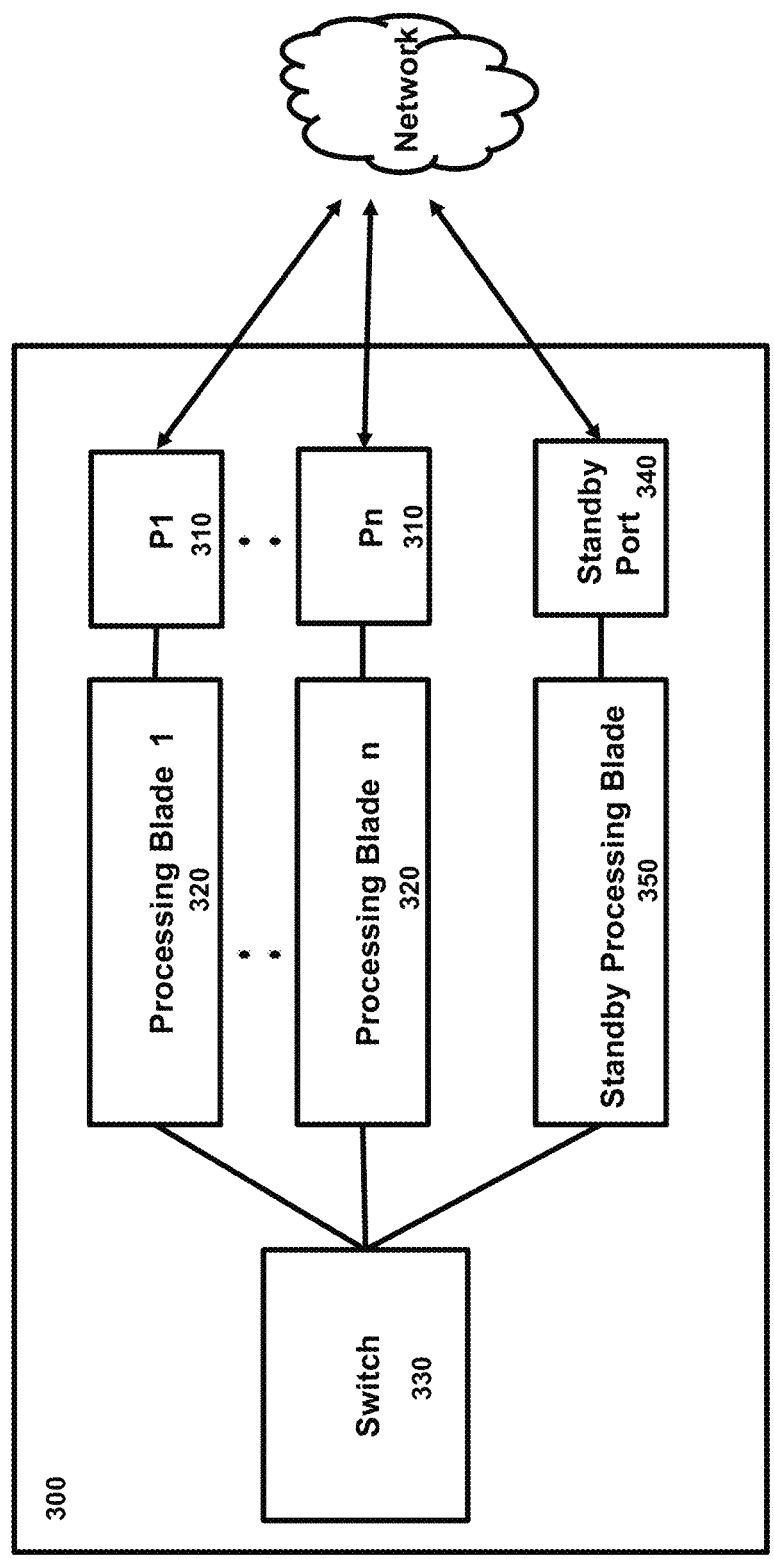
FIG. 3 illustrates a block diagram of another conventional modular computing and communication system.

In the sample network traffic path in the conventional computing and communications system as illustrated in FIG. 2, lack of any dynamic traffic distribution at the ingress ports 110 often leads to inefficient routing of packets within the system 100. Due to static mapping of the ports 110 to the processing blades 120, all the ingress traffic at the port 110 (e.g., P1) is forwarded to the corresponding processing blade 120 (e.g., B1) attached to the port 110 (e.g., P1). Only upon further inspection of the network traffic at the processing blade 120 (e.g., B1), the assigned destination processing blade 120 (e.g., B2) can be determined. This can lead to forwarding of the network traffic from one processing blade (e.g., B1) to a different processing blade (e.g., B2) via the switch 130. In this example, egress path of all network traffic traverses from one processing blade (e.g., B2) to the switch 130 then to a different processing blade (e.g., B1) then to the port (e.g., P1) out to the network. Multiple hops for network packets can add latency to network traffic delivery, leading to poor end user experiences.

Figure 11:
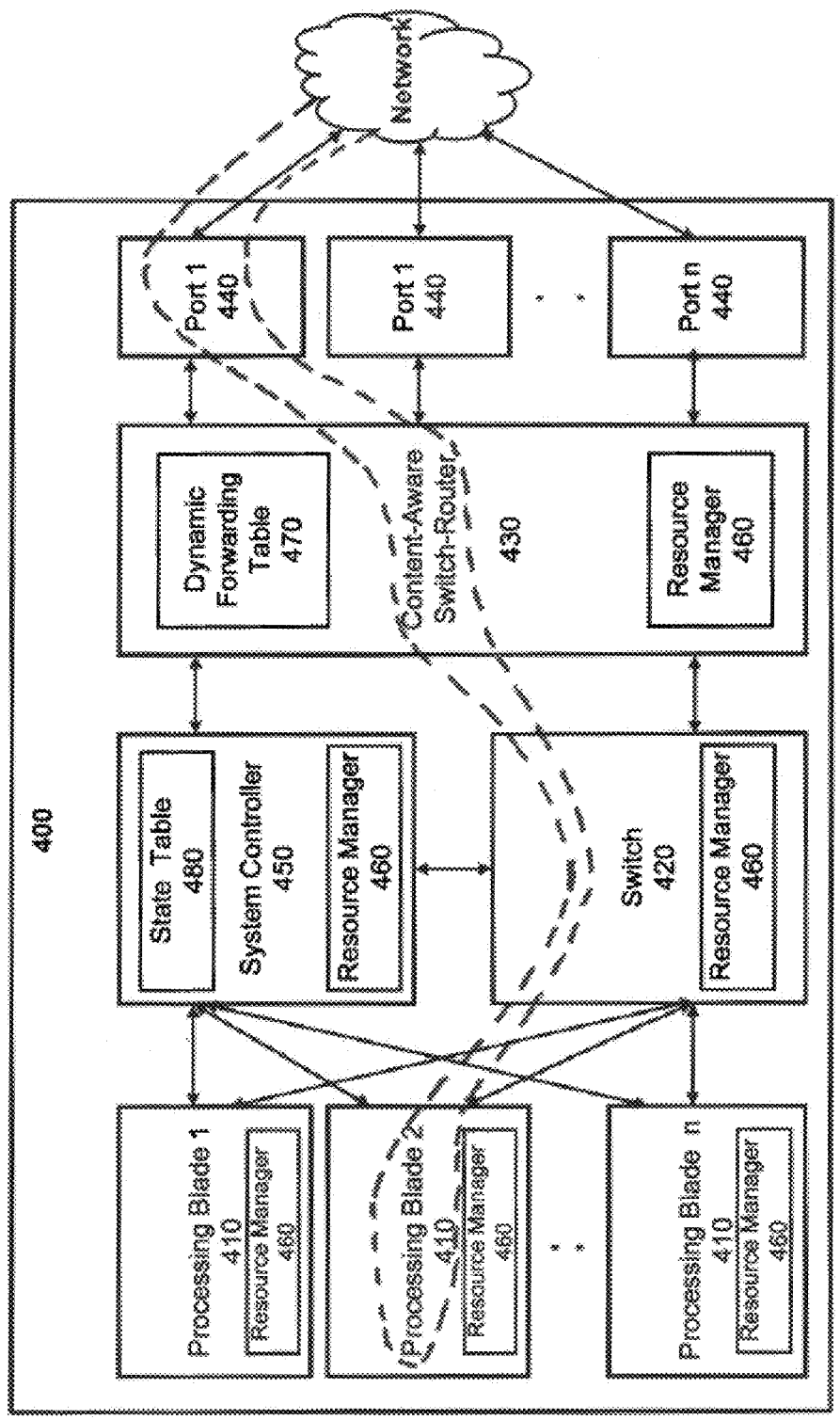
FIG. 11 illustrates a sample network traffic path in a highly scalable modular system according to certain embodiments of the disclosed subject matter.

In contrast, systems and methods according to some embodiments of the disclosed subject matter (e.g., 400) can help reduce system latency. In some embodiments, as illustrated in FIG. 11, the system 400 according to certain embodiments of the disclosed subject matter can help avoid packet hops across multiple processing blades 410. In the system 400, the CSR 430 can de-couple the processing blades (PB) 410 from the ports 440. The SC 450 can create and update the dynamic network traffic routing rules in the DFT 470 in the CSR 430. The rules can be based in part on any combination of the source-destination addresses, application type, protocol type, and key words of the network traffic streams. The rules can also take into consideration session load of each processor blade 410, e.g., as reported by the ST 480. The SC 450 can also update the DFT 470 in real time to reflect the current network and processing load conditions within the system 400. network Traffic can enter the system 400 through any active network port (e.g., P1). The CSR 430 can examine the network traffic, classify, and tag the network traffic and forward it to the appropriate processor blade (e.g., PB2) based on the matching rule in the DFT 470. Traffic originating from a processing blade (e.g., PB2) can be processed in a similar manner and be forwarded to a particular port (e.g., P1) or another processing blade (e.g., PBn) based on the matching rule in the DFT 470. This feature can provide a meshed any-port to any-blade connectivity and can thus minimize traffic latency by limiting the number of hops for network traffic within the system 400. In most instances, network traffic can make only one hop in and one hop out of the system 400 and at most traverse one processing blade 410. Therefore, the system 400 can reduce overall latency of network traffic, improving end user experiences.

Improved System Reliability and Service Continuity

In yet another aspect, systems and methods according to some embodiments of the disclosed subject matter can improve system reliability and service continuity.

In some embodiments, processor blades 410 can broadcast their health, operational states and load/utilization information to the SC 450. Upon detecting a processing blade failure, the SC 450 can promptly modify the dynamic forwarding rules in the DFT 470 in the CSR 430 and redistribute the traffic/processing load of the failed or failing processing blade across the remaining healthy processing blades.

To illustrate this feature in an example, assuming there are four processing blades 410 (labeled PB1, PB2, PB3, PB4) in the system 400 and each processing blade 410 is running at 75% capacity (or less). At some point in time, PB4 fails. The SC 450 can detect the blade failure, e.g., via a heartbeat mechanism. The SC 450 can then modify the forwarding rules in the DFT 470 in the CSR 430 to redistribute PB4's traffic/processing loads across the remaining three processing blades, thus improving system reliability. The respective loads on the three healthy processing blades can increase to 100% as a result of the redistribution. In addition to redistributing the failed PB4's traffic load, the SC 450 can also send the state information of all active sessions on the failed PB4 to the remaining active processing blades, e.g., via a software-based messaging mechanism. The ST 480 on the SC 450 can help provide seamless handoff of network connections and computing sessions that were previously hosted on the failed PB4 to the newly assigned processing blades in the system 400, thus improving service continuity.

Enhanced System Availability

In yet another aspect, systems and methods according to some embodiments of the disclosed subject matter can enhance system availability.

In some embodiments, the RMs 460 on the processing blades 410 can distribute the resource utilization and current workload of the processing blades 410 to the SC 450, e.g., via a software-based messaging mechanism. The SC 450 can aggregate and maintain the state information in the ST 480. The ST 480 thus can have knowledge of the current session load of each processing blade 410 in the system 400 and can install rules in the DFT 470 of the CSR 430. CSR 430 can be responsible for distribution of ingress network traffic from the ports 440 and assignment of the processing blades 410 to the incoming network traffic flows.

In one example, the CSR 430 can help maintain that at any given time the average session load per processing blade (Lb) is:

$$Lb < Cb*(N-1)/N, \quad (1)$$

where:
Lb=average session load per blade;
Cb=session capacity per blade;
N=number of blades in the system.

In this example, at any given time each processing blade 410 can have excess capacity of at least Cb/N; the total excess capacity across all the processing blades 410 in the system 400 is at least Cb, which is the capacity of a single processing blade 410. Lb can be adjusted such that the total excess capacity can be any multiple (whole or fractional) of Cb. Using equation (1), it follows that for N=2, 3, 4, 5, Lb is limited to Cb/2, Cb*2/3, Cb*3/4 and Cb*4/5 respectively.

In some embodiments, each processing blade 410 in the system 400 can be paired with its neighbor processing blade, thus forming a session pair (SP). Each processing blade 410 in the system 400 can have a unique ID. For the purpose of illustration, each processing blade 410 can have an ID (i) that is simply the slot number it occupies in the system 400, with i taking on the values (1, . . . , N) and N being the total number of slots in the system 400. For example, in a 3-blade system, processing blade 1 (PB1) and processing blade 2 (PB2) can form one session pair; processing blade 2 (PB2) and processing blade 3 (PB3) can form another session pair; and processing blade 3 (PB3) and processing blade 1 (PB1) can form yet another session pair. To keep track of the pairings we can denote the first session pair as SP12, the second session pair as SP23, and the third session pair as SP31. Each processing blade can have the session information of its paired processing blade. When one processing blade 410 experiences a hardware or software fault which causes it to fail, the SC 450 can detect the failure and re-distribute the sessions associated from the failed processing blade to other processing blade(s).

For the purpose of illustration, assuming that PB2 has failed and the SC 450 has detected its failure in a timely manner. This failure detection can trigger a number of actions in the system 400. PB3 (paired with PB2) can send PB2's session information to the SC 450. The SC 450, after reviewing the current loads on PB1 and PB3, can apportion PB2's sessions between the two remaining processing blades (PB1 and PB3). The SC 450 can also modify the forwarding rules in the DFT 470 in real time and by re-routing the network traffic being routed to the failed PB2 to its paired processing blade and/or other processing blade(s). These actions can be executed rather quickly (e.g., on the order of milliseconds), thus causing little or no impact to affected network traffic flows. In addition, in some situations such as both PB1 and PB3 are lightly loaded, PB1 and PB3 can form a pairing relationship with one another. The pairing relationships among active processing blades can be adjusted automatically or on demand, e.g., when the failed PB2 is restored to working order.

Figure 12:
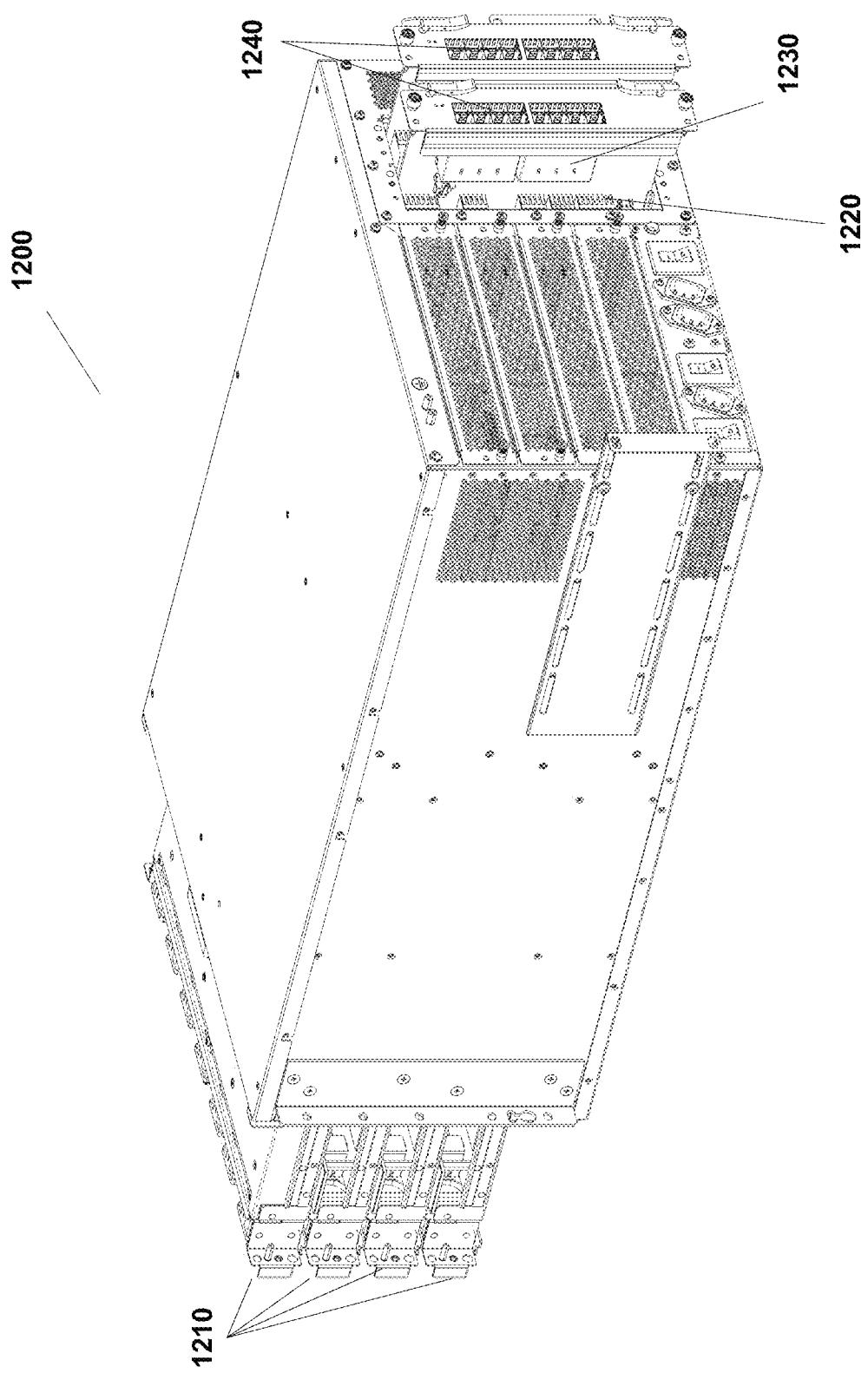
FIG. 12 illustrates a perspective schematic view of an exemplary computing device according to certain embodiments of the disclosed subject matter.

FIG. 12 illustrates a perspective schematic view of an exemplary computing device 1200 according to certain embodiments of the disclosed subject matter. The device 1200 can include one or more processing blades 1210 interconnected by a switch 1220, which in turn is connected to a CSR 1230. The CSR can provide connections between ports 1240 and the processor blades 1210.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

A "server," "client," "agent," "module," "interface," and "host" is not software per se and includes at least some tangible, non-transitory hardware that is configured to execute computer readable instructions. In addition, the phrase "based on" does not imply exclusiveness—for example, if X is based on A, X can also be based on B, C, and/or D, . . . .

What is claimed is:
1. A computing system for processing network traffic, comprising:
a plurality of network ports of a network device configured to receive network traffic;
a plurality of processing blades of the network device, not directly coupled with the plurality of network ports, configured to process the network traffic, each of the plurality of processing blades belonging to one or more session pairs of processing blades;
a switch of the network device coupled with the plurality of processing blades and configured to support inter-blade communications among the plurality of processing blades;
a router of the network device disposed between, and coupled with, the switch and the plurality of network ports, the router configured to forward the network traffic from the switch to one or more of the plurality of processing blades based on forwarding rules without communicating with other switches;
and a system controller of the network device disposed between, and coupled to, the router and the plurality of processing blades, the system controller configured to detect a fault of one of the plurality of processing blades and further configured to update the forwarding rules of the router, upon detecting the fault, to divert the network traffic from the faulted processing blade to at least one different processing blade.

2. The computing system of claim 1, wherein the fault indicates the one of the plurality of processing blades has failed or is about to fail.

3. The computing system of claim 1, wherein the system controller includes a state table containing session information received from the plurality of processing blades.

4. The computing system of claim 3, wherein each of the plurality of processing blades contains a resource manager configured to gather the session information of the each of the plurality of processing blades and send the session information to the system controller.

5. The computing system of claim 1, wherein each processing blade within a session pair contains session information of the other processing blade in the same session pair.

6. The computing system of claim 5, wherein
a healthy processing blade in a session pair to which the faulted processing blade belongs is configured to, upon detecting the fault, send the session information of the faulted processing blade to the system controller, and
the system controller is further configured to send the session information of the faulted processing blade to the at least one different processing blade.

7. The computing system of claim 1, wherein the plurality of processing blades are configured to communicate with the system controller via a software-based messaging mechanism.

8. The computing system of claim 1, wherein each processing blade is further configured to detect a fault of the other processing blade within a session pair to which the each processing blade belongs.

9. A computerized method of processing network traffic, comprising:
receiving network traffic at a network port of a network device, wherein the network port is not directly coupled with a plurality of processing blades of the network device;
detecting by a system controller of the network device a fault of one of the plurality of processing blades, wherein
the system controller is disposed between, and coupled to, a router of the network device and the plurality of processing blades, and
the faulted processing blade belongs to a session pair along with another processing blade;
updating by the system controller forwarding rules of the router, upon detecting the fault, to divert the network traffic from the faulted processing blade to at least one different processing blade, wherein the router is disposed between, and coupled with, a switch of the network device and the network port; and
forwarding the network traffic by the router from the switch to one or more of the plurality of processing blades based on the updated forwarding rules without communicating with other switches.

10. The computerized method of claim 9, wherein the fault indicates the one of the plurality of processing blades has failed or is about to fail.

11. The computerized method of claim 9, further comprising receiving at the system controller session information from the plurality of processing blades.

12. The computerized method of claim 9, further comprising:
sending the session information of the faulted processing blade, by a healthy processing blade in a session pair to which the faulted processing blade belongs, to the system controller; and
sending the session information of the faulted processing blade, by the system controller, to the at least one different processing blade.

13. The computing method of claim 9, wherein the plurality of processing blades are configured to communicate with the system controller via a software-based messaging mechanism.

14. A non-transitory computer readable medium having executable instructions operable to cause an apparatus to:
receive network traffic at a network port of the apparatus, wherein the network port is not directly coupled with a plurality of processing blades of the apparatus;
detect, by a system controller of the apparatus a fault of one of the plurality of processing blades, wherein
the system controller is disposed between, and coupled to, a router of the apparatus and the plurality of processing blades, and
the faulted processing blade belongs to a session pair along with another processing blade;
update by the system controller forwarding rules of the router, upon detecting the fault, to divert the network traffic from the faulted processing blade to at least one different processing blade, wherein the router is disposed between, and coupled with, a switch of the apparatus and the network port; and
forward the network traffic by the router from the switch to one or more of the plurality of processing blades based on the updated forwarding rules without communicating with other switches.

* * * * *